J. Swan,
Auger Handle.
No. 97,830. Patented Dec. 14, 1869.
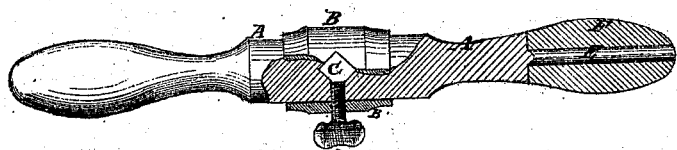

United States Patent Office.

JAMES SWAN, OF SEYMOUR, CONNECTICUT.

Letters Patent No. 97,830, dated December 14, 1869.

IMPROVEMENT IN AUGER-HANDLES.

The Schedule referred to in these Letters Patent and making part of the same.

*To all whom it may concern:*

Be it known that I, JAMES SWAN, of Seymour, in the county of New Haven, and State of Connecticut, have invented a new and useful Improvement in Auger-Handles; and I do hereby declare that the following is a full, clear, and exact description thereof, which will enable others skilled in the art to make and use the same, reference being had to the accompanying drawings, forming part of this specification.

The object of this invention is to provide a cheap, simple, and durable handle for augers for boring in wood, one which shall require no fitting except to make the auger enter the socket, and which shall be of such size and shape that the shanks of ordinary augers shall enter without any fitting at all.

The invention consists in the use of a socket-band or sleeve on the centre of the handle with a fastening set-screw; and in the method of forming the handle so as to preserve its true proportions, as hereinafter more fully described.

The accompanying drawing represents a view of an auger-handle constructed according to my invention, the drawing being partly in section, to show the manner in which it is constructed.

Similar letters of reference indicate corresponding parts.

A is the handle, which is made of any suitable kind of wood.

B is the metallic sleeve through which the socket C is made.

This socket or square hole is made through the wood handle, and is of a size to admit the shanks of ordinary augers.

D is the fastening thumb-screw, which enters the angle of the socket, as seen in the drawing, the screw-thread with which it engages being cut through the sleeve.

Should the auger-shank be smaller than the socket, the screw will force it into the opposite angle, and fasten it tightly in place for use.

I am aware that sleeve-sockets have been used on auger-handles before, but in such cases the shank of each auger requires to be fitted especially for fastening therein by a groove or other device, with a spring-snap on the socket, instead of a simple thumb-screw.

In cases where the sleeve-socket has been used on the wooden handle, the proper proportions of the handle have been destroyed in getting the sleeve to its place; or the sleeve has been made heavy and long enough to allow the handle to be made in two parts, inserted in each end of the sleeve.

The latter method involves unnecessary expense, while the ends thus inserted soon become loose from wear, and have to be renewed.

My method is to continue the wood handle A entirely through the sleeve, thus retaining its full strength.

For the purpose of securing the proper sized palm-bulbs on the handle, I turn a tenon, E, on one end of the handle, and slip on and fasten a tubular piece, F, which I turn off so as to make it correspond in all respects with the opposite end.

By making the handle in this manner, the middle of it is retained of proper size, while the bulbs are made of a suitable size to fill the palm of the hand, thus rendering it easy to turn the auger.

By this method, the handle is made strong and durable, while the auger is fastened thereto in the simplest, cheapest, and most durable manner.

Having thus described my invention,

I claim as new, and desire to secure by Letters Patent—

An auger-handle, formed in one piece, surrounded by a sleeve, having an angular hole transversely through the middle to receive the auger-shank, and provided with a set-screw entering at the vertex of an angle, as shown and described.

JAMES SWAN.

Witnesses:
B. W. SMITH,
SAMUEL A. BEACH.